(12) United States Patent
Lin et al.

(10) Patent No.: US 11,057,070 B1
(45) Date of Patent: Jul. 6, 2021

(54) SIGNAL RECEIVING DEVICE ADAPTING TO SIGNAL INPUT MODE AND SIGNAL PROCESSING METHOD FOR THE SAME

(71) Applicant: REALTEK SEMICONDUCTOR CORP., Hsinchu (TW)

(72) Inventors: Chen-Kang Lin, Hsinchu County (TW); Hung-Yi Chang, Hsinchu (TW); Bing-Juo Chuang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/069,961

(22) Filed: Oct. 14, 2020

(30) Foreign Application Priority Data

Jan. 8, 2020 (TW) .................................. 109100529

(51) Int. Cl.
*H04B 1/18* (2006.01)
*H04L 25/02* (2006.01)
*H04L 7/00* (2006.01)
*H04B 1/40* (2015.01)

(52) U.S. Cl.
CPC ................. *H04B 1/18* (2013.01); *H04B 1/40* (2013.01); *H04L 7/0008* (2013.01); *H04L 25/0272* (2013.01); *H04L 25/0296* (2013.01)

(58) Field of Classification Search
CPC ........... H04B 1/18; H04B 1/40; H04L 7/0008; H04L 25/0296; H04L 25/0272
See application file for complete search history.

(56) References Cited

U.S. PATENT DOCUMENTS

| 6,703,866 | B1 * | 3/2004 | Arimilli | ......... | H03K 19/017581 |
| | | | | | 326/30 |
| 6,794,919 | B1 * | 9/2004 | Volk | .......................... | H03K 5/08 |
| | | | | | 327/20 |
| 2018/0316526 | A1 * | 11/2018 | Wang | ........................ | H04L 5/22 |

* cited by examiner

*Primary Examiner* — David B Lugo
(74) *Attorney, Agent, or Firm* — Li & Cai Intellectual Property (USA) Office

(57) ABSTRACT

A signal receiving device adapting to a signal input mode and a signal processing method for the same are provided. The signal receiving device can determine various signal input modes, such as a differential signal or a single-ended signal, and select an appropriate signal source, such that the signal receiving device can not only receive the input signal correctly, but also adjust the received input signal to a differential signal with the same amplitude and opposite phases to make subsequent data analysis work easier.

15 Claims, 9 Drawing Sheets

SIGNAL RECEIVING DEVICE ADAPTING TO SIGNAL INPUT MODE AND SIGNAL PROCESSING METHOD FOR THE SAME

CROSS-REFERENCE TO RELATED PATENT APPLICATION

This application claims the benefit of priority to Taiwan Patent Application No. 109100529, filed on Jan. 8, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a signal receiving device, and more particularly to a signal receiving device adapting to a signal input mode and a signal processing method for the same.

BACKGROUND OF THE DISCLOSURE

The existing mainstream method of signal transmission is mainly differential transmission. The differential transmission uses two signal lines to transmit signals simultaneously, and these two signals are called differential signals since they have the same amplitude and opposite phases. The differential signals can have strong anti-noise capabilities. The reason is that noises are generally equal and simultaneously loaded on the two signals, and a receiving end analyzes (decodes) data sent by a transmitting end according to a difference between the two signals so that when the two signals are subtracted, the noises are then eliminated.

In addition, the differential signals also have advantages of reducing electromagnetic interference (EMI) and accurate timing positioning. However, if the receiving end encounters an input mode with a non-differential signal, such as a single-ended signal or an in-phase signal, the receiving end must adaptively adjust the signal processing method, or otherwise cause signal reception errors to occur and lead to failure to correctly parse the data. Therefore, how to design a signal receiving device and a signal processing method that can adapt to the signal input mode has become an important issue in the art.

SUMMARY OF THE DISCLOSURE

In response to the above-referenced technical inadequacies, the present disclosure provides a signal receiving device adapting to a signal input mode. The signal receiving device includes a first multiplexer, a second multiplexer, a third multiplexer, and a control circuit. Two input terminals of the first multiplexer respectively receive a first input signal and a second input signal, an output terminal of the first multiplexer outputs a first output signal, and the first multiplexer selects the first input signal to be output as the first output signal in an initial state. Two input terminals of the second multiplexer respectively receiving the first input signal and the second input signal, an output terminal of the second multiplexer outputs a second output signal, and the second multiplexer selects the second input signal to be output as the second output signal in the initial state. In addition, one of the input terminals of the third multiplexer receives the DC signal DC-converted from the first output signal, and the other input terminal receives the second output signal. An output of the third multiplexer outputs a third output signal. In the initial state, the third multiplexer selects and outputs the second output signal as the third output signal. The control circuit has two input terminals for receiving a first output signal and a third output signal, respectively. The control circuit is configured to mutually subtract the first output signal and the third output signal to generate a first difference signal and a second difference signal, respectively count numbers of signal edges of the first difference signal and the second difference signal within a first preset time, and determine whether the signal input mode is a differential signal according to the numbers of the signal edges counted within the first preset time. In response to the signal input mode being determined as not to be the differential signal, the control circuit output a mode selecting signal with a first logic level to control the third multiplexer to select the DC signal to be output as the third output signal. In response to the signal input mode being determined as the differential signal, the control circuit outputs the mode selecting signal with a second logic level to control the third multiplexer to keep selecting the second output signal to be output as the third output signal.

In addition, an embodiment of the present disclosure further provides a signal processing method that can be executed in the signal receiving device of the foregoing embodiment. The signal processing method includes the following steps. Firstly, controlling a first multiplexer to select a first input signal to be output as a first output signal, controlling a second multiplexer to select a second input signal to be output as a second output signal, and controlling a third multiplexer to select the second input signal to be output as a third output signal. Secondly, the signal processing method includes detecting whether a signal level of the first output signal and/or a signal level of the third output signal exceeds a first threshold voltage. In response to the signal levels of the first output signal and/or the third output signal exceeding the first threshold voltage, interactively subtracting the first output signal and the third output signal to generate a first difference signal and a second difference signal, and respectively counting numbers of signal edges of the first difference signal and the second difference signal within the first preset time. Next, the signal processing method further includes determining whether the numbers of the signal edges counted within the first preset time conform to a first expected value. In response to determining the numbers of the signal edges counted within the first preset time does not conform to the first expected value, outputting a mode selection signal with a first logic level to control the third multiplexer to change to select a DC signal DC-converted from the first output signal to be output as the third output signal; and in response to determining the numbers of the signal edges counted within the first preset time conforms to the first expected value, outputting the mode selection signal with a second logic level to control the third multiplexer to keep selecting the second output signal to be output as the third output signal.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
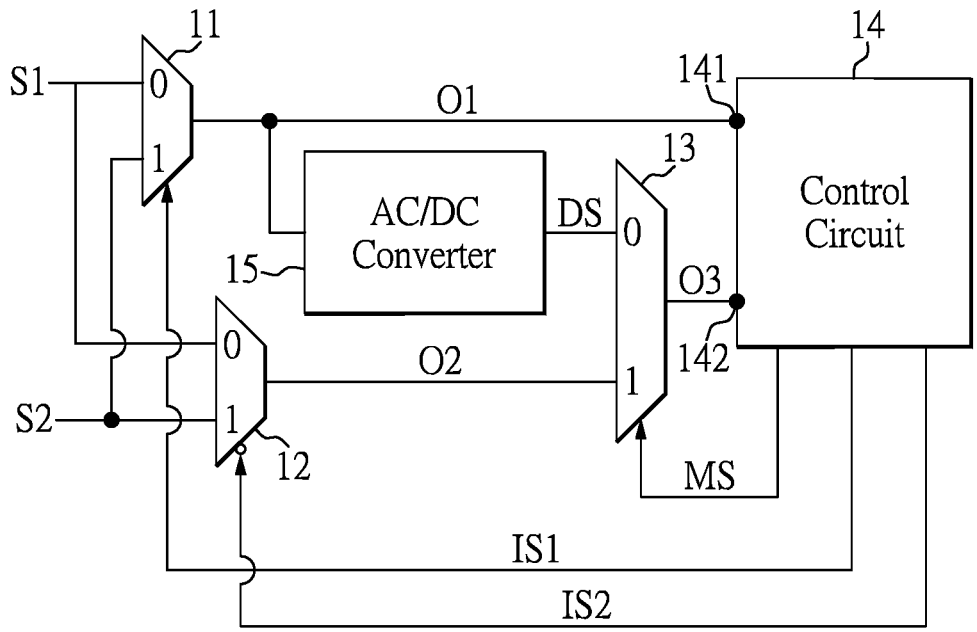
FIG. 1 is a block diagram of a signal receiving device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a signal receiving device according to an embodiment of the present disclosure. The signal receiving device 1 includes a first multiplexer (also referred to as a data selector) 11, a second multiplexer 12, a third multiplexer 13, and a control circuit 14. Two input terminals of the first multiplexer 11 respectively receive a first input signal S1 and a second input signal S2. For example, an input terminal 0 of the first multiplexer 11 receives the first input signal S1, and an input terminal 1 of the first multiplexer 11 receives the second input signal S2, but the present disclosure is not limited thereto. An output terminal of the first multiplexer 11 outputs a first output signal O1, and the first multiplexer 11 selects the first input signal S1 to be output as the first output signal O1 in an initial state. Similarly, two input terminals of the second multiplexer 12 also receive the first input signal S1 and the second input signal S2, respectively. For example, an input terminal 0 of the second multiplexer 12 receives the first input signal S1, and an input terminal 1 of the second multiplexer 12 receives the second input signal S2, but the present disclosure is not limited thereto. An output terminal of the second multiplexer 12 outputs a second output signal O2, and the second multiplexer 12 selects the second input signal S2 to be output as the second output signal O2.

In addition, one of the input terminals of the third multiplexer 13 receives the DC signal DS DC-converted from the first output signal O1, and the other input terminal receives the second output signal O2. For example, an input terminal 0 of the third multiplexer 13 can be coupled to the output terminal of the first multiplexer 11 through an AC/DC converter 15 to receive the DC signal DS DC-converted from the first output signal O1, and an input terminal 1 of the third multiplexer 13 is directly coupled to the output terminal of the second multiplexer 12 to receive the second output signal O2 output by the second multiplexer 12, but the present disclosure is not limited thereto. An output terminal of the third multiplexer 13 outputs a third output signal O3, and the third multiplexer 13 selects the second output signal O2 to be output as the third output signal O3 in the initial state. The control circuit 14 has an input terminal 141 and an input terminal 142 to receive the first output signal O1 and the third output signal O3, respectively. The control circuit 14 is configured to perform interactive subtraction on the first output signal O1 and the third output signal O3 to generate a first difference signal D1 and a second difference signal D2, and respectively count numbers of signal edges of the first difference signal D1 and the second difference signal D2 within a first preset time. In this embodiment, the number of the signal edges of the first difference signal D1 counted in the first preset time can be referred to as a first count value C1, and the number of the signal edges of the second difference signal D2 counted in the first preset time can be referred to as a second count value C2, and the control circuit 14 can determine, according to the numbers of these signal edges counted in the first preset time (i.e., the first count value C1 and the second count value C2) whether the signal input mode is a differential signal.

In the present embodiment, in response to the signal input mode being determined not the differential signal, the control circuit 14 output a mode selecting signal MS with a first logic level to control the third multiplexer 13 to select the DC signal DS to be output as the third output signal. In response to the signal input mode being determined as the differential signal, the control circuit 14 outputs the mode selecting signal MS with a second logic level to control the third multiplexer 13 to keep selecting the second output signal O2 to be output as the third output signal O3. That is, the signal receiving device 1 presets a preset signal input mode as a differential signal, or presets the first input signal S1 and the second input signal S2 (sent by the transmitting end) as differential signals. Therefore, in the initial state, the control circuit 14 will control the first multiplexer 11 and the second multiplexer 12 to respectively select the first input signal S1 and the second input signal S2 to be output as the first output signal O1 and the second output signal O2, and controls the third multiplexer 13 to select the second output signal O2 to be output as the third output signal O3, such that the first output signal O1 and the third output signal O3 received by the control circuit 14 are equivalent to the first input signal S1 and the second input signal S2. However, when the first input signal S1 and the second input signal S2 are preset as differential signals, the control circuit 14 cannot guarantee that the first input signal S1 and the second input signal S2 belong to a positive signal P and a negative signal N of the differential signal. Therefore, the control circuit 14 can be configured to perform interactive subtraction on the first output signal O1 and the third output signal O3 to generate the first difference signal D1 equal to the first output signal O1 subtracting the third output signal O3, and generate the second difference signal D2 equal to the third output signal O3 subtracting the first output signal O1.

It should be understood that if the first input signal S1 and the second input signal S2 are indeed differential signals, then the first difference signal D1 and the second difference signal D2 are also differential signals. Taking differential signal of DisplayPort Auxiliary Channel (AUX) as an example, within the first preset time being 10 milliseconds (ms), the numbers of the signal edges of the first difference signal D1 and the second difference signal D2 (i.e., the first count value C1 and the second count value C2) should be larger or equal to 15, respectively. Therefore, the control circuit 14 can determine (check) whether the first count value C1 and the second count value C2 conform to a first expected value, such as 15. When the first count value C1 and the second count value C2 meet the first expected value, the control circuit 14 determines that the signal input mode is the differential signal, and outputs the mode selection signal MS with the second logic level to control the third multiplexer 13 to keep selecting the second output signal O2 to be output as the third output signal O3, or keep the preset signal input mode as the differential signal. It is worth mentioning that when the control circuit 14 determines that the signal input mode is the differential signal, the control circuit 14 can firstly anticipate that the first input signal S1 and the second input signal S2 respectively belong to the positive signal P and the negative signal N of the differential signal. Details of the control circuit 14 to determine whether the first input signal S1 and the second input signal S2 conform to the expected positive signal P and the negative signal N of the differential signals, and relatively control the first multiplexer 11 and the second multiplexer 12 to respectively select the positive signal P and the negative signal N belonging to the differential signal to be output will be described in other paragraphs hereinafter, and thus will be omitted here.

In addition, when the first count value C1 and the second count value C2 do not conform to the first expected value, the control circuit 14 determines that the signal input mode is not a differential signal, and the existing non-differential signal is commonly a single-ended signal. A transmission method utilized for the single-ended signal refers to transmitting data in a manner that one of the first input signal S1 and the second input signal S2 belongs to an AC signal, and the other belongs to a ground or floating signal. That is, in a case of the single-ended signal, only one input terminal of the first multiplexer 11 and one input terminal of the second multiplexer 12 receive AC signals, and the other one input terminal of the first multiplexer 11 and the other one input terminal of the second multiplexer 12 receives a ground or a null signal. Therefore, when the control circuit 14 determines that the signal input mode is not the differential signal, the control circuit 14 can control the first multiplexer 11 to select the first input signal S1 or the second input signal S2 belonging to the AC signal to be output as the first output, and outputs the mode selection signal MS with the first logic level to control the third multiplexer 13 to change to select the DC signal DS DC-converted from the first output signal O1, such that the first output signal O1 and the third output signal O3 received by the control circuit 14 afterward are equivalent to the AC signal and a reference signal, or the preset signal input mode is changed to the single-ended signal. Similarly, when the control circuit 14 determines that the signal input mode is not the differential signal, the control circuit 14 can firstly anticipate that the first input signal S1 belongs to the AC signal. Details for the control circuit 14 to determine whether the first input signal S1 belongs to the AC signal as expected, and correspondingly control the first multiplexer 11 to select the first input signal S1 or the second input signal S2 belonging to the AC signal to be output as the first output signal O1 will be described in other paragraphs hereinafter, and thus will be omitted here.

It can be understood that since the input terminal 0 and the input terminal 1 of the third multiplexer 13 respectively receives the DC signal DS and the second output signal O2, the first logic level and the second logic level of the mode selection signal MS refers to a low logic level "0" and a high logic level "1", respectively. However, if other embodiments are modified to use the input terminal 0 and the input terminal 1 of the third multiplexer 13 to receive the second output signal O2 and the DC signal DS, respectively, the first logic level and the second logic level of the mode selection signal MS then refers to the high logic level "1" and the low logic level "0", respectively. In a word, this modification does not affect the implementation of the present disclosure.

Figure 2:
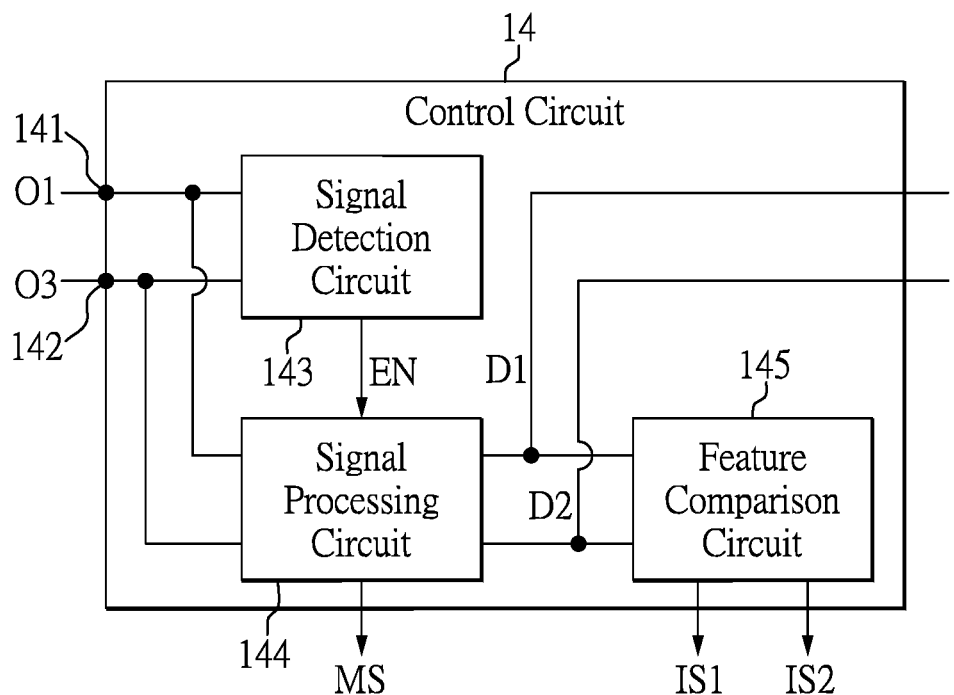
FIG. 2 is a block diagram of a control circuit in the signal receiving device of FIG. 1.

Next, reference is further made to FIG. 2. FIG. 2 is a block diagram of a control circuit 14 in the signal receiving device 1 of FIG. 1. The control circuit 14 can include a signal detection circuit 143, a signal processing circuit 144, and a feature comparison circuit 145. The signal detection circuit 143 is coupled to an input terminal 141 and an input terminal 142 of the control circuit 14, and is configured to detect whether signal levels of the first output signal O1 and/or the third output signal O3 exceeds a first threshold voltage Vth1. In response to detecting the signal levels of the first output signal O1 and/or the third output signal O3 exceed a first threshold voltage Vth1, the signal detection circuit 143 outputs an enabling signal EN to instruct the signal processing circuit 144 to start performing a subtraction operation on the first output signal O1 and the third output signal O3. That is, the signal detection circuit 143 is provided to detect whether any data is indeed inputted to the signal receiving device 1. In response to detecting the signal levels of the first output signal O1 and/or the third output signal O3 do not exceed a first threshold voltage Vth1, the signal processing circuit 144 does not need to perform the interactive subtraction on the first output signal O1 and the third output signal O3, and the signal detection circuit 143 can use the first threshold voltage Vth1 to avoid mistakenly treating noises with the low signal level as data. In addition, in the initial state, the first output signal O1 and the third output signal O3 are equivalent to the first input signal S1 and the second input signal S2. However, at this time, the control circuit 14 cannot guarantee that the first input signal S1 and the second input signal S2 are indeed differential signals, so as long as the signal level of any one of the first output signal O1 and the third output signal O3 is detected to exceed the first threshold voltage Vth1, the signal detection circuit 143 outputs the enabling signal EN to instruct the signal processing circuit 144 to start performing the subtraction operation on the first output signal O1 and the third output signal O3.

Figure 3:
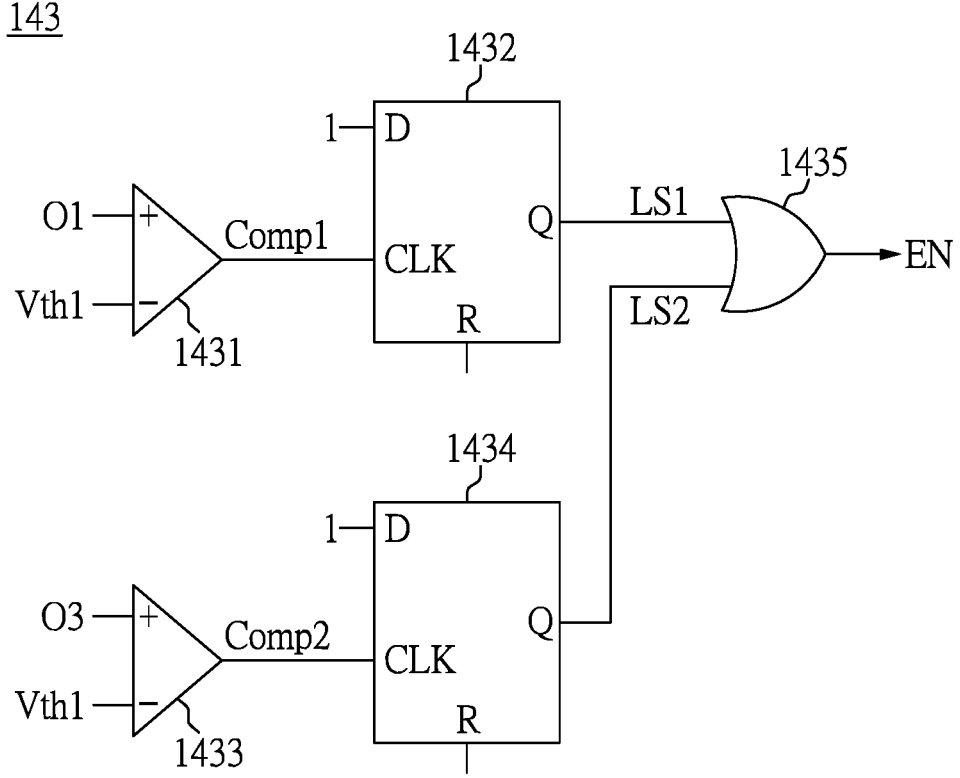
FIG. 3 is a circuit schematic diagram of a signal detection circuit in the control circuit of FIG. 2.

For example, reference is made to FIG. 3. FIG. 3 is a circuit schematic diagram of the signal detection circuit 143 in the control circuit 14 of FIG. 2. The signal detection circuit 143 can include a comparator 1431, a flip-flop 1432, a comparator 1433, a flip-flop 1434, and an OR gate 1435. The comparator 1431 has a non-inverting input terminal and an inverting input terminal respectively receiving the first output signal O1 and a first threshold voltage Vth1, in response to the signal level of the first output signal O1 exceeding the first threshold voltage Vth1, an output terminal of the comparator 1431 outputs a comparison signal Comp1 with a high logic level "1", and in response to the signal level of the first output signal O1 not exceeding the first threshold voltage Vth1, the output terminal of the comparator 1431 outputs the comparison signal Comp1 with a low logic level "0". In addition, a clock input terminal CLK of the flip-flop 1432 is coupled to an output terminal of the comparator 1431, and a data input terminal D of the flip-flop 1432 receives a fixed signal with a high logic level "1". Therefore, when the comparator 1431 outputs the comparison signal Comp1 with the high logic level "1", an output terminal Q of the flip-flop 1432 keeps outputting a latch signal LS1 with a high logic level "1" until a reset terminal R of the flip-flop 1432 receives a pulse signal with a high logic level "1", the flip-flop 1432 keeps outputting the latch signal LS1 with a low logic level "0".

Correspondingly, the comparator 1433 has a non-inverting input terminal and an inverting input terminal respectively receiving the third output signal O3 and the first threshold voltage Vth1, in response to the signal level of the third output signal O3 exceeding the first threshold voltage Vth1, an output terminal of the comparator 1433 outputs a comparison signal Comp2 with a high logic level "1", and in response to the signal level of the third output signal O3 not exceeding the first threshold voltage Vth1, the output terminal of the comparator 1433 outputs the comparison signal Comp2 with a low logic level "0". In addition, a clock input terminal CLK of the flip-flop 1434 is coupled to the output terminal of the comparator 1433, and a data input terminal D of the flip-flop 1434 also receives the fixed signal with the high logic level "1". Therefore, when the comparator 1433 outputs the comparison signal Comp2 with the high logic level "1", an output terminal Q of the flip-flop 1434 keeps outputting a latch signal LS2 with a high logic level "1" until a reset terminal R of the flip-flop 1434 receives a pulse signal with a high logic level "1", the flip-flop 1434 keeps outputting the latch signal LS2 with a low logic level "0". Since operating principles of the comparators and the flip-flops are already known to those skilled in the art, the above-mentioned details will not be repeated here.

In addition, the OR gate 1435 has two input terminals respectively receiving the latch signal LS1 and the latch signal LS2, and an output terminal for outputting an operation result generated after an OR logic is applied to the first latch signal LS1 and the second latch signal LS2 as the enabling signal EN. That is, when the OR gate 1435 receives at least one latch signal with a high logic level "1", the OR gate 1435 outputs the enabling signal EN with a high logic level "1" to indicate the signal processing circuit 144 to start performing the subtraction operation on the first output signal O1 and the third output signal O3. It should be noted that the implementation of the above-mentioned signal detection circuit 143 is only an example, and it is not intended to limit the present disclosure. Those skilled in the art should be able to perform implementation and design for the signal detection circuit 143 based on actual needs or applications.

Next, as shown in FIG. 2, the signal processing circuit 144 is coupled to the input terminal 141 and the input terminal 142 of the control circuit 14, and when the signal processing circuit 144 receives the enabling signal EN outputted by the signal detection circuit 143 with the high logic level "1", the signal processing circuit 144 is configured to perform the interactive subtraction on the first output signal O1 and the third output signal O3. The signal processing circuit 144 can further compare a result of the interactive subtraction with a second threshold voltage Vth2 to eliminate noises whose signal level are smaller than the second threshold voltage Vth2 to generate a first difference signal D1 and a second difference signal D2, count the numbers of the signal edges of the first difference signal D1 and the second difference signal D2 within the first preset time, and determine whether the signal input mode is a differential signal according to the numbers of these signal edges counted in the first preset time (i.e., the first count value C1 and the second count value C2). That is, the signal processing circuit 144 uses the second threshold voltage Vth2 to avoid mistakenly treating noises with the low signal level as data. It should be noted that the first threshold voltage Vth1 and the second threshold voltage Vth2 can be the same voltage value or different voltage values. In a word, those skilled in the art should be able to design according to actual needs or applications.

Figure 4:
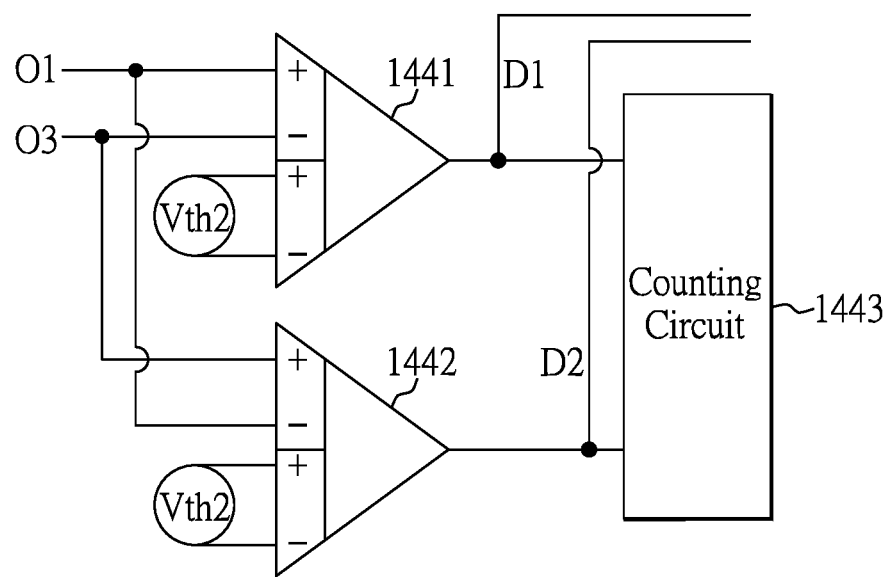
FIG. 4 is a circuit schematic diagram of a signal processing circuit in the control circuit of FIG. 2.

For example, reference is made to FIG. 4, and FIG. 4 is a circuit schematic diagram of a signal processing circuit 144 in the control circuit 14 of FIG. 2. The signal processing circuit 144 can include a comparator 1441, a comparator 1442, and a counting circuit 1443. The comparator 1441 has a first non-inverting input terminal and a first inverting input terminal respectively receiving the first output signal O1 and the third output signal O3, and the comparator 1441 is configured to generate the second threshold voltage Vth2 between a second non-inverting input terminal and a second inverting input terminal of the comparator 1441, such that the comparator 1441 compares a result of subtracting the third output signal O3 from the first output signal O1 with the second threshold voltage Vth2 to generate the first difference signal D1 to be output from an output terminal of the comparator 1441. That is, when the result of subtracting the third output signal O3 from the first output signal O1 exceeds the second threshold voltage Vth2, the comparator 1441 outputs the first difference signal D1 equal to the third output signal O3 subtracting the first output signal O1, and when the result of subtracting the third output signal O3 from the first output signal O1 does not exceed the second threshold voltage Vth2, the comparator 1441 outputs the first difference signal D1 with a low logic level "0".

Correspondingly, the comparator 1442 has a first non-inverting input terminal and a first inverting input terminal respectively receiving the third output signal O3 and the first output signal O1, and the comparator 1442 is configured to generate the second threshold voltage Vth2 between a second non-inverting input terminal and a second inverting input terminal of the comparator 1442, such that the comparator 1442 compares a result of subtracting the first output signal O1 from the third output signal O3 with the second threshold voltage Vth2 to generate the second difference signal D2 to be output from an output terminal of the comparator 1442. In addition, the counting circuit 1443 is coupled to the output terminals of the comparator 1441 and the comparator 1442. The counting circuit 1443 is configured to receive the first difference signal D1 and the second difference signal D2, count the numbers of the signal edges of the first difference signal D1 and the second difference signal D2 within the first preset time, and determine, according to the numbers of signal edges counted within the first preset time, whether the signal input mode is the differential signal, thereby outputting the mode selection signal MS with the first logic level or the second logic level. Since the implementation details are as described above, the details will not be described in detail here. In short, the present disclosure does not limit the specific implementation of the signal processing circuit 144. Those skilled in the art should able to design according to actual needs or applications.

It should be noted that after the signal processing circuit 144 determines that the signal input mode is not the differential signal, and outputs the mode selection signal MS with the first logic level to control the third multiplexer 13 to select the DC signal DS DC-converted from the first output signal O1 to be output, the signal processing circuit 144 can further be configured to output a pulse signal with a high logic level "1" to the reset terminals R of the flip-flop 1432 and the flip-flop 1434 to force the flip-flop 1432 and the flip-flop 1434 to change to keep outputting the latch signals LS1 and LS2 with low logic level "0". In other words, when the preset signal input mode is changed to a single-ended signal, the signal processing circuit 144 can be further configured to reset an operation of the signal detection circuit 143, such that the signal detection circuit 143 re-detects whether the signal level of the first output signals O1 and/or the signal level of the third output signal O3 exceeds the first threshold voltage Vth1, and also resets an operation of the signal processing circuit 144. For example, the first count value C1 and the second count value C2 are reset, and a new preset time and a new expected value (i.e., a second preset time and a second expected value) are reset to assist in determining whether the signal input mode is the single-ended signal. Therefore, when the signal processing circuit 144 receives the enabling signal EN outputted by the signal detection circuit 143 with the high logic level "1" again, the signal processing circuit 144 is then configured to start performing the interactive subtraction on the first output signal O1 and the third output signal again, then compare the result of the interactive subtraction with the second threshold voltage Vth2 to eliminate noises whose signal levels are less than the second threshold voltage Vth2 to generate the first difference signal D1 and the second difference signals D2, and respectively count the numbers of the signal edges of the first difference signal D1 and the second difference signal D2 within the second preset time.

In this embodiment, the number of the signal edges of the first difference signal D1 counted in the second preset time can be referred to as a third count value C3, the number of the signal edges of the second difference signal D2 counted in the second preset time can be referred to as a fourth count value C4, and the signal processing circuit 144 can determine, according to the numbers of these signal edges counted in the second preset time (i.e., the third count value C3 and the fourth count value C4) whether the signal input mode is the single-ended signal. That is, since the preset signal input mode has been changed to the single-ended signal, when the third count value C3 and the fourth count value C4 meet the second expected value, the signal processing circuit 144 determines that the signal input mode is the single-ended signal, thereby outputting the mode selection signal MS with the first logic level to control the third multiplexer 13 to keep selecting the DC signal DS to be output as the third output signal O3, or to keep the preset signal input mode as the single-ended signal. Conversely, when the third count value C3 and the fourth count value C4 do not meet the second expected value, the signal processing circuit 144 determines that the signal input mode is not the single-ended signal, and the signal processing circuit 144 then outputs the mode selection signal MS with the second logic level to control the third multiplexer 13 to change to select the second output signal O2 to be output as the third output signal O3, or the preset signal input mode is restored to the differential signal, and this embodiment can reset operations of the signal detection circuit 143 and the signal processing circuit 144 to re-determine whether the signal input mode is the differential signal. Since other details have already been described in the foregoing, repeated descriptions will be omitted here.

In addition, as shown in FIG. 2, the feature comparison circuit 145 is coupled to the signal processing circuit 144, and configured to perform signal feature comparison on the first difference signal D1 and/or the second difference signal D2 to determine whether the first difference signal D1 and/or the second difference signal D2 have an expected at least one first signal feature, or whether signal features of the first difference signal D1 and/or signal features of the second difference signal D2 meet expectations. In response to determining that the first difference signal D1 and/or the second difference signal D2 have the expected at least one signal feature, that is, the comparison is successful, it represents either that the first input signal S1 and the second input signal S2 respectively belong to a positive signal P and a negative signal N of the differential signal as expected, or that the first input signal S1 belongs to the AC signal as expected. Therefore, the feature comparison circuit 145 outputs at least one input source selection signal to control the first multiplexer 11 and the second multiplexer 12 to keep respectively selecting the first input signal S1 and the second input signal S2 to be output as the first output signal O1 and the second output signal O2, or only control the first multiplexer 11 to keep selecting the first input signal S1 to be output as the first output signal O1.

Correspondingly, in response to determining that the first difference signal D1 and/or the second difference signal D2 do not have the expected at least one signal feature, that is, the comparison is unsuccessful, representing that the first input signal S1 and the second input signal S2 do not respectively belong to a positive signal P and a negative signal N of the differential signal as expected, or representing that the first input signal S1 does not belong to the AC signal as expected. Therefore, the feature comparison circuit 145 outputs at least one input source selection signal to control the first multiplexer 11 and the second multiplexer 12 to respectively select the second input signal S2 and the first input signal S1 to be output as the first output signal O1 and the second output signal O2, or only control the first multiplexer 11 to change to select the second input signal S2 to be output as the first output signal O1. In the present embodiment, the expected at least one signal feature is signal content defined in a transmission standard specification, and is not limited to a specific transmission standard. The at least one signal feature generally refers to a signal feature that can be used to distinguish a positive signal P and a negative signal N of the differential signal, or a signal feature that can be used to distinguish the AC signal. In a word, the present disclosure does not limit the specific implementation for the signal feature comparison circuit 145 to perform the feature comparison on the first difference signal D1 and/or the second difference signal D2.

Figure 5A:
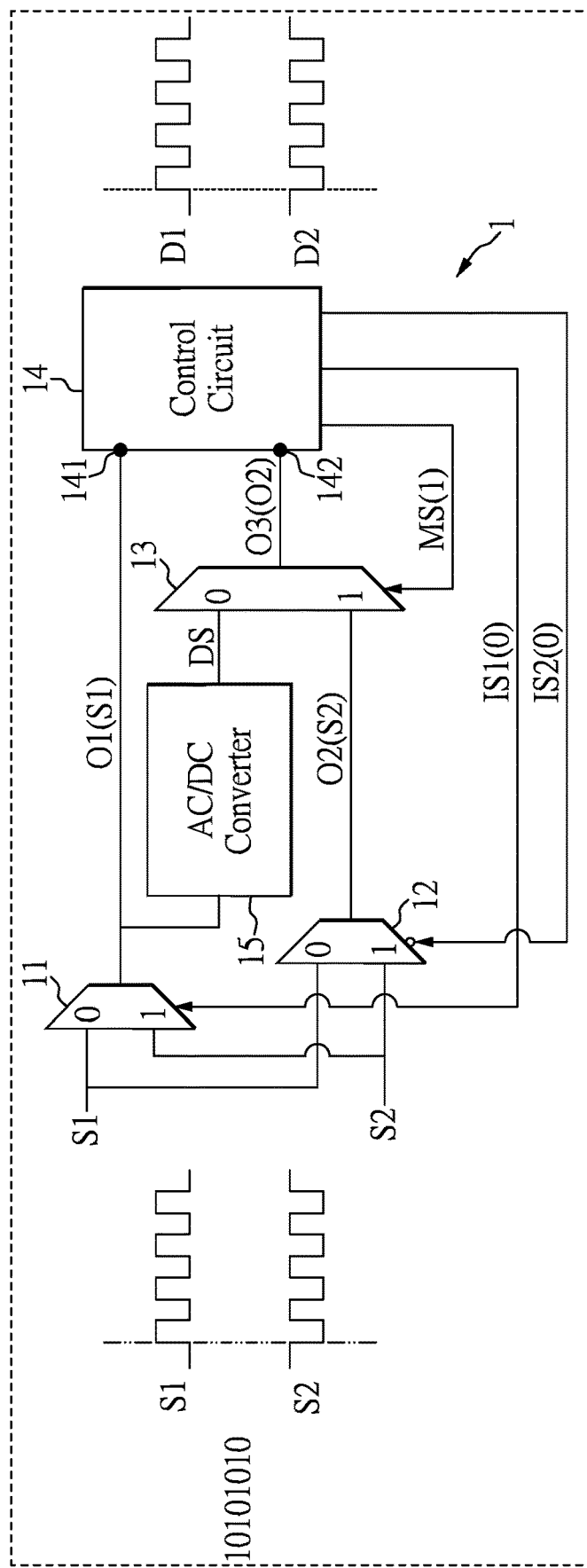
FIGS. 5A and 5B are schematic diagrams of the signal receiving device of FIG. 1 used for a signal input mode being a differential signal.
Figure 5B:
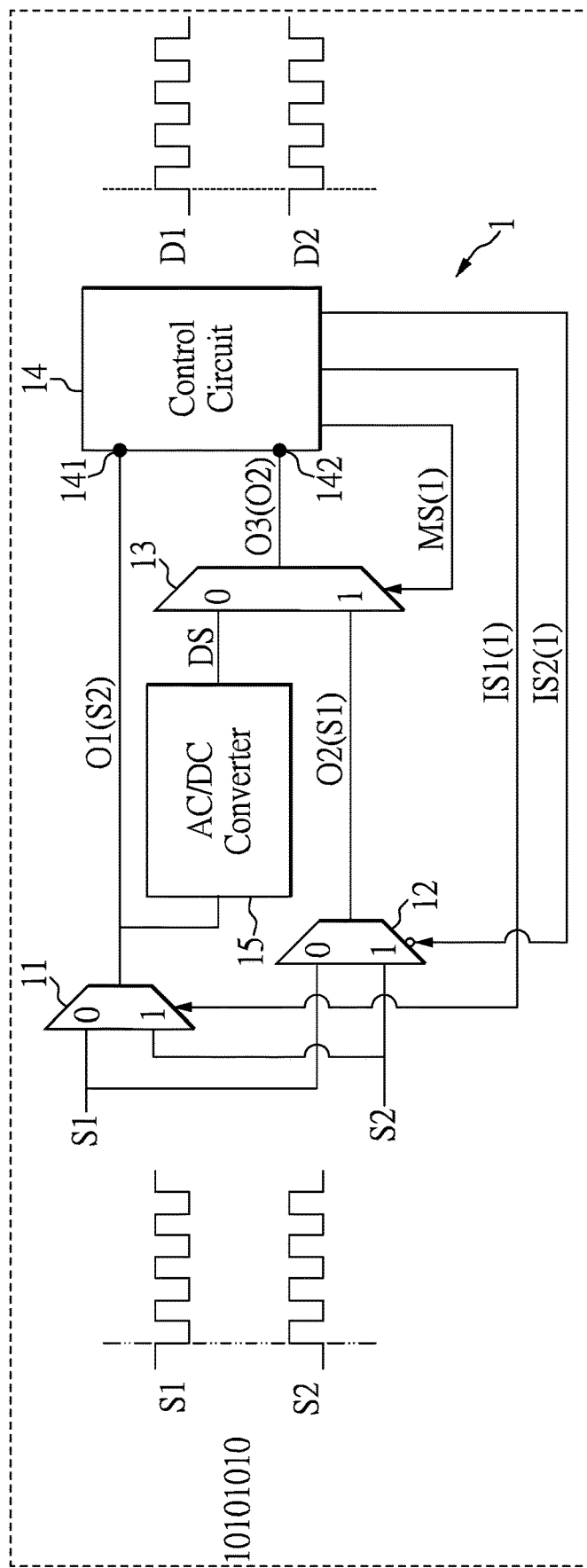

For example, reference is made to FIGS. 5A and 5B, and FIGS. 5A and 5B are schematic diagrams of the signal receiving device of FIG. 1 used for a signal input mode being a differential signal. As shown in FIG. 5A, in response to determining that the signal input mode is the differential signal, the control circuit 14 outputs a mode selection signal MS with a high logic level "1" to control the third multiplexer 13 to keep selecting the second output signal O2 to be output as the third output signal O3, and since the first input signal S1 and the second input signal S2 in FIG. 5A indeed respectively belong to the positive signal P and the negative signal N of the differential signal as expected, thus the control circuit 14 outputs a first input source selection signal IS1 and a second input source selection signal IS2 with low logic level "0" to control the first multiplexer 11 and the second multiplexer 12 to keep respectively selecting the first input signal S1 and the second input signal S2 to be output as the first output signal O1 and the second output signal O2.

It should be noted that, in the present embodiment, since the input terminals 0 of the first multiplexer 11 and the second multiplexer 12 both receive the first input signal S1, and the input terminals 1 of the first multiplexer 11 and the second multiplexer 12 both receive the second input signal S2, a selection terminal of the second multiplexer 12 receives an inverted second input source selection signal IS2, therefore, in the embodiment of FIG. 5A, the control circuit 14 will output the first input source selection signal IS1 and the second input source selection signal IS2 both with low logic level "0", but the present disclosure is not limited thereto. In a word, the control circuit 14 should be able to determine the logic level of the input source selection signal according to actual input source configurations of the first multiplexer 11 and the second multiplexer 12. In addition, in this embodiment, the first input source selection signal IS1 and the second input source selection signal IS2 can also be combined into a single input source selection signal, but this does not affect the implementation of the present disclosure.

In contrast, unlike the embodiment of FIG. 5A, the first input signal S1 and the second input signal S2 in FIG. 5B do not respectively meet the expectation to belong to the positive signal P and the negative signal N of the differential signal, but the first input signal S1 and the second input signal S2 belonging respectively to the negative signal N and the positive signal P of the differential signal, therefore, the control circuit 14 outputs the first input source selection signal IS1 and the second input source selection signal IS2 with high logic level "1" to control the first multiplexer 11 and the second multiplexer 12 to respectively change to select the second input signal S2 and the first input signal S1 to be output as the first output signal O1 and the second output signal O2. Since other details have already been described in the foregoing, repeated descriptions will be omitted here.

Figure 6A:
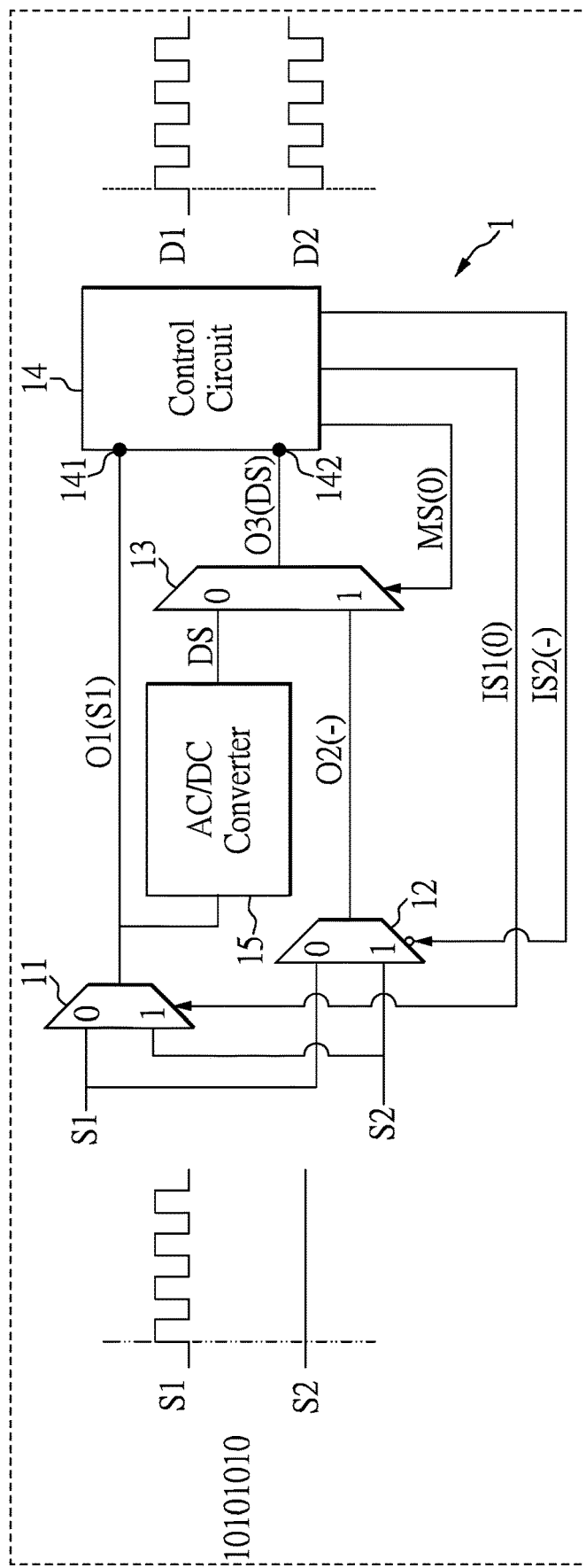
FIGS. 6A and 6B are schematic diagrams of the signal receiving device of FIG. 1 used for the signal input mode being a single-ended signal.
Figure 6B:
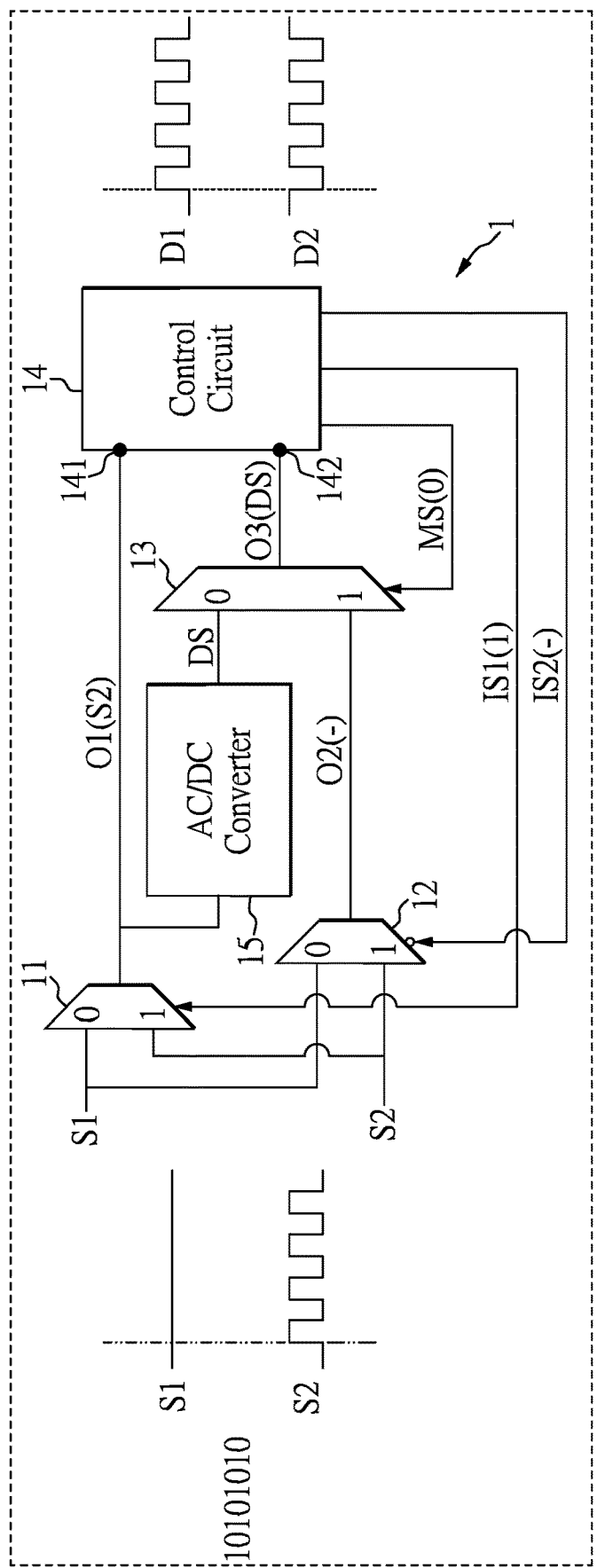

In addition, reference is made to FIGS. 6A and 6B, and FIGS. 6A and 6B are schematic diagrams of the signal receiving device of FIG. 1 used for the signal input mode being a single-ended signal. As shown in FIG. 6A, in response to determining that the signal input mode is not the differential signal, the control circuit 14 outputs the mode selection signal MS with low logic level "0" to control the third multiplexer 13 to change to select the DC signal DS DC-converted from the first output signal O1 to be output as the third output signal O3, and since the first input signal S1 in FIG. 6A indeed belongs to the AC signal as expected, the control circuit 14 outputs the first input source selection signal IS1 with low logic level "0" to control the first multiplexer 11 to keep selecting the first input signal S1 to be output as the first output signal O1.

In contrast, unlike the embodiment of FIG. 6A, the first input signal S1 in FIG. 6B does not meet the expectation to belong to the AC signal, but the second input signal S2 belongs to the AC signal, therefore, the control circuit 14 outputs the first input source selection signal IS1 with high logic level "1" to control the first multiplexer 11 to change to select the second input signal S2 to be output as the first output signal O1. Since other details have already been described in the foregoing, repeated descriptions will be omitted here. However, since the signal receiving device 1 whose signal input mode is the single-ended signal will not be affected by the output of the second multiplexer 12, the control circuit 14 of FIG. 6A and FIG. 6B need not to consider the logic level of the output second input source selection signal IS2, or the control circuit 14 need not to consider an output selection of the second multiplexer 12.

Figure 7:
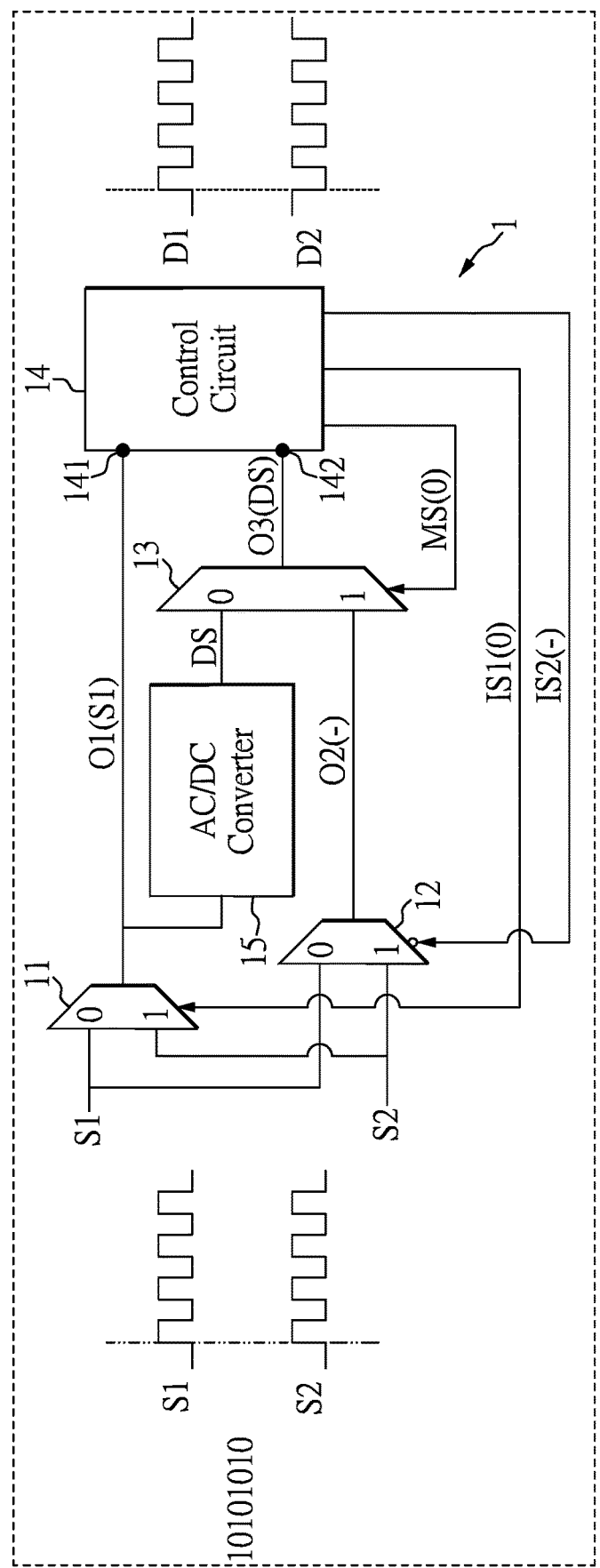
FIG. 7 is a schematic diagram of the signal receiving device of FIG. 1 used for the signal input mode being an in-phase signal.

On the other hand, in addition to the single-ended signal, in-phase signals are also common non-differential signals. The transmission method utilized for the in-phase signals refers to transmitting data in a manner that both the first input signal S1 and the second input signal S2 belong to the AC signals, and the two AC signals are called in-phase signals since they have the same phase. For example, reference is made to FIG. 7, and FIG. 7 is a schematic diagram of the signal receiving device 1 of FIG. 1 used for the signal input mode being an in-phase signal. It can be known that since the first input signal S1 and the second input signal S2 in FIG. 7 can both meet the expectations to belong to the AC signal, it represents that the in-phase signals can be received by using a receiving manner of the single-ended signal. Therefore, the control circuit 14 in FIG. 7 outputs the first input source selection signal IS1 with low logic level "0" to control the first multiplexer 11 to keep selecting the first input signal S1 to be output as the first output signal O1. Since other details have already been described in the foregoing, repeated descriptions will be omitted here.

However, as can be seen from FIGS. 5A to 7, regardless of whether the signal input mode is the differential signal, the single-ended signal, or the in-phase signal, the control circuit 14 can generate the first difference signal D1 and the second difference signal D2 being the differential signals. That is, after the control circuit 14 outputs an appropriate mode selection signal MS and at least one input source selection signal, representing that the signal receiving device 1 can adapt to the signal input mode to correctly receive the input signal, and the signal receiving device 1 can adjust the received input signals into differential signals with the same amplitude and opposite phases (i.e., the first difference signal D1 and the second difference signal D2) by using the signal processing circuit 144 of the control circuit 14. In this way, subsequent data analysis work can be made easier, or for a data decoding circuit at a receiving end that does not need to perform other pre-processes on the input signal to correctly analyze (decode) data transmitted by the receiving end through the first difference signal D1 and the second difference signal D2 generated by the signal processing circuit 144. Therefore, as shown in FIG. 2, in this embodiment, the first difference signal D1 and the second difference signal D2 generated by the signal processing circuit 144 can be directly transmitted to a back-end data decoding circuit (not shown). In a word, the present disclosure does not limit specific implementation for the receiving end to analyze the first difference signal D1 and the second difference signal D2.

Figure 8A:
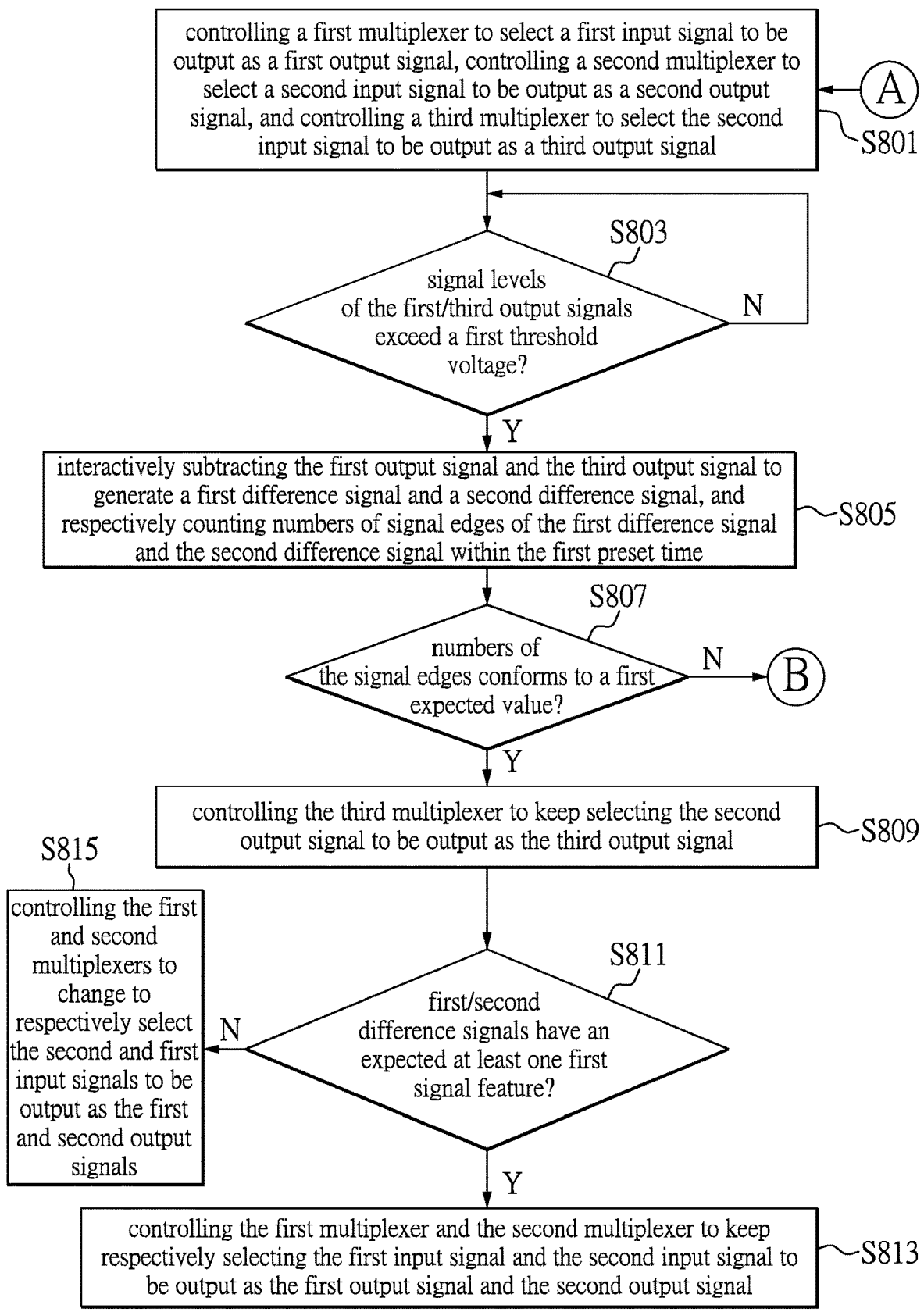
FIGS. 8A and 8B are flowcharts of a signal processing method according to an embodiment of the present disclosure.
Figure 8B:
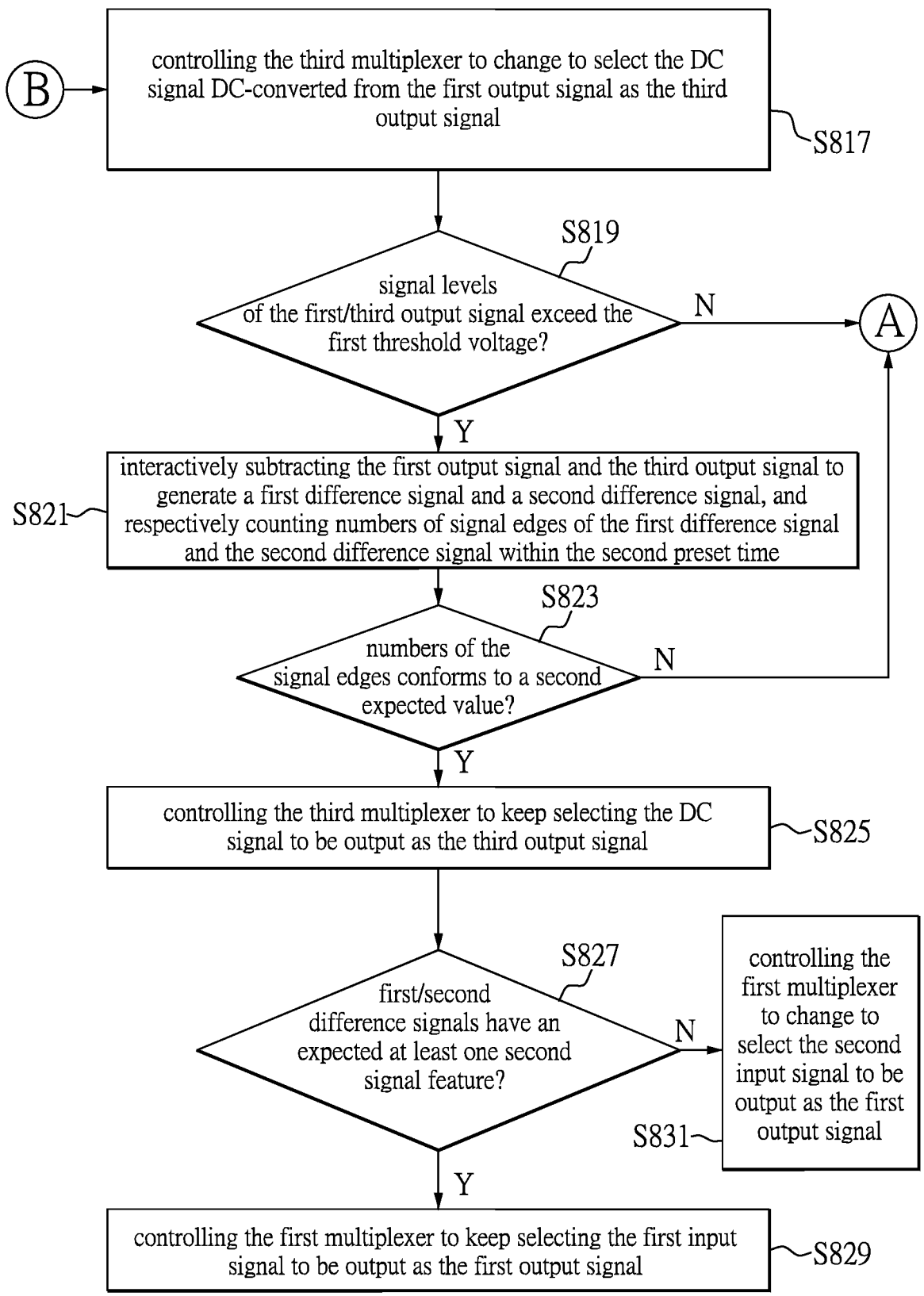

Finally, in order to further explain an operation flow of the aforementioned signal receiving device 1, the present disclosure further provides an embodiment of a signal processing method for the same. Reference is made to FIGS. 8A and 8B, and FIGS. 8A and 8B are flowcharts of a signal processing method according to an embodiment of the present disclosure. It should be noted that the signal processing method of FIG. 8A and FIG. 8B can be executed in the signal receiving device 1 of FIG. 1, and thus reference is made to FIG. 1 together. The present disclosure does not limit that the signal processing method can only be executed in the signal receiving device 1 of FIG. 1. In addition, since the detailed step flow is as described in the foregoing embodiment, it is only summarized here and will not be described redundantly.

As shown in FIGS. 8A and 8B, in step S801, controlling a first multiplexer 11 to select a first input signal S1 to be output as a first output signal O1, controlling a second multiplexer 12 to select a second input signal S2 to be output as a second output signal O2, and controlling a third multiplexer 13 to select the second input signal O2 to be output as a third output signal O3. That is, the preset signal input mode is a differential signal. Next, in step S803, detecting whether a signal level of the first output signal O1 and/or a signal level of the third output signal O3 exceeds a first threshold voltage Vth1. In response to the signal level of the first output signal O1 and/or the signal level of the third output signal O3 exceeding the first threshold voltage Vth1, the signal receiving device 1 executes step S805. In response to the signal level of the first output signal O1 and/or the signal level of the third output signal O3 not exceeding the first threshold voltage Vth1, the signal receiving device 1 returns to step S803 until it detects that the signal level of the first output signal O1 and/or the signal level of the third output signal O3 exceeds the first threshold voltage Vth1. In step S805, interactively subtracting the first output signal O1 and the third output signal O3 to generate a first difference signal D1 and a second difference signal D2, and respectively counting numbers of signal edges of the first difference signal D1 and the second difference signal D2 within the first preset time (e.g., 10 milliseconds).

Next, in step S807, determining (checking) whether the numbers of the signal edges (i.e., a first count value C1 and a second count value C2) counted within the first preset time conform to a first expected value, for example, 15. In response to determining the numbers of the signal edges counted within the first preset time conform to the first expected value, the signal receiving device 1 performs steps S809 and S811. In response to determining the numbers of the signal edges counted within the first preset time do not conform to the first expected value, the signal receiving device 1 performs step S817. In step S809, outputting a mode selection signal MS with a second logic level to control the third multiplexer 13 to keep selecting the second output signal O2 to be output as the third output signal O3, or to keep the preset signal input mode as the differential signal. In addition, in step S811, performing a signal feature comparison on the first difference signal D1 and/or the second difference signal D2 to determine whether the first difference signal D1 and/or the second difference signal D2 have an expected at least one first signal feature. In response to determining that the first difference signal D1 and/or the second difference signal D2 have the expected at least one first signal feature, that is, the comparison is successful, representing that the first input signal S1 and the second input signal S2 respectively belong to a positive signal P and a negative signal N of the differential signal as expected, and thus the signal receiving device 1 performs step S813. In response to determining that the first difference signal D1 and/or the second difference signal D2 do not have the expected at least one first signal feature, that is, the comparison is unsuccessful, representing that the first input signal S1 and the second input signal S2 do not respectively belong to a positive signal P and a negative signal N of the differential signal as expected, and thus the signal receiving device 1 performs step S815.

In step S813, outputting at least one input source selection signal to control the first multiplexer 11 and the second multiplexer 12 to keep respectively selecting the first input signal S1 and the second input signal S2 to be output as the first output signal O1 and the second output signal O2. In contrast, in step S815, outputting at least one input source selection signal to control the first multiplexer 11 and the second multiplexer 12 to change to respectively select the second input signal S2 and the first input signal S1 to be output as the first output signal O1 and the second output signal O2. It should be noted that the at least one first signal feature of step S811 refers to a signal feature that can be used to distinguish the positive signal P and the negative signal N of the differential signal, and after the signal receiving device 1 controlled the first multiplexer 11 and the second multiplexer 12 to change to respectively select the second input signal S2 and the first input signal S1 to be output as the first output signal O1 and the second output signal O2, the signal receiving device 1 can continue to perform the signal feature comparison on the first difference signal D1 and the second difference signal D2 to determine again whether the second input signal S2 and the first input signal S1 meets the expectation to respectively belong to the positive signal P and the negative signal N of the differential signal. In response to determining the second input signal S2 and the first input signal S1 do not meet the expectations to respectively belong to the positive signal P and the negative signal N of the differential signal, the signal receiving device 1 is restored to control the first multiplexer 11 and the second multiplexer 12 to respectively select the first input signal S1 and the second input signal S2 to be output as the first output signal O1 and the second output signal O2, but this does not affect the implementation of the present disclosure.

On the other hand, in step S817, outputting the mode selection signal MS with the first logic level to control the third multiplexer 13 to change to select the DC signal DS DC-converted from the first output signal O1 as the third output signal O3, or the preset signal input mode is changed to a single-ended signal. It should be noted that in step S817, the signal receiving device 1 also resets operations of the signal detection circuit 143 and the signal processing circuit 144. Therefore, in step S819 after step S817, the signal receiving device 1 will re-detect whether the signal level of the first output signal O1 and/or the signal level of the third output signal O3 exceeds the first threshold voltage Vth1. In response to detecting that the signal level of the first output signal O1 and/or the signal level of the third output signal O3 exceeds the first threshold voltage Vth1, the signal receiving device 1 performs interactive subtraction on the first output signal O1 and the third output signal O3 to generate the first difference signal D1 and the second difference signal D2, and respectively counts the numbers of the signal edges of the first difference signal D1 and the second difference signal D2 within a second preset time (i.e., step S821). In response to detecting that the signal level of the first output signal O1 and/or the signal level of the third output signal O3 do not exceed the first threshold voltage Vth1, the process returns back to step S801.

Next, in step S823, determining (checking) whether the numbers of the signal edges (i.e., a third count value C3 and a fourth count value C4) counted within the second preset time conform to a second expected value. In response to determining whether the numbers of the signal edges counted within the second preset time conform to the second expected value, the signal receiving device 1 performs steps S825 and S827. In response to determining whether the numbers of the signal edges counted within the second preset time do not conform to the second expected value, the signal receiving device 1 returns to execute step S801, and the signal receiving device 1 also resets the operations of the signal detection circuit 143 and the signal processing circuit 144 while returning to step S801. Since other details have already been described in the foregoing, repeated descriptions will be omitted here. In step S825, outputting the mode selection signal MS with the first logic level to control the third multiplexer 13 to keep selecting the DC signal DS to be output as the third output signal O3, or to keep the preset signal input mode as the single-ended signal.

In addition, in step S827, performing the signal feature comparison on the first difference signal D1 and/or the second difference signal D2 to determine whether the first difference signal D1 and/or the second difference signal D2 have an expected at least one second signal feature. In response to determining that the first difference signal D1 and/or the second difference signal D2 have the expected at least one second signal feature, that is, the comparison is successful, representing that the first input signal S1 belongs to the AC signal as expected, and thus the signal receiving device 1 performs step S829. In response to determining that the first difference signal D1 and/or the second difference signal D2 do not have the expected at least one second signal feature, that is, the comparison is unsuccessful, representing that the first input signal S1 does not belong to the AC signal as expected, and thus the signal receiving device 1 performs step S831.

In step S829, outputting at least one input source selection signal to control the first multiplexer 11 to keep selecting the first input signal S1 to be output as the first output signal O1. In contrast, in step S831, outputting at least one input source selection signal to control the first multiplexer 11 to select the second input signal S2 to be output as the first output signal O1. It should be noted that the at least one second signal feature of step S827 refers to a signal feature that can be used to distinguish the AC signal, and after the signal receiving device 1 controlled the first multiplexer 11 to change to select the second input signal S2 to be output as the first output signal O1, the signal receiving device 1 can continue to perform the signal feature comparison on the first difference signal D1 and/or the second difference signal D2 to determine again whether the second input signal S2 meets the expectation to respectively belong to the AC signal. In response to determining the second input signal S2 do not meet the expectation to belong to the AC signal, the signal receiving device 1 is restored to control the first multiplexer 11 to select the first input signal S1 to be output as the first output signal O1, but this does not affect the implementation of the present disclosure.

In conclusion, embodiments of the present disclosure provide a signal receiving device adapting to a signal input mode and a signal processing method for the same. The signal receiving device can determine various signal input modes, such as a differential signal or a single-ended signal, and select an appropriate signal source, such that the signal receiving device can not only correctly receive the input signal, but also adjust the received input signal to a differential signal with the same amplitude and opposite phases to make subsequent data analysis work easier.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A signal receiving device adapting to a signal input mode, comprising:
    a first multiplexer having a first input terminal and a second input terminal respectively receiving a first input signal and a second input signal, and an output terminal outputting a first output signal, wherein the first multiplexer selects the first input signal to be output as the first output signal in an initial state;
    a second multiplexer having a first input terminal and a second input terminal respectively receiving the first input signal and the second input signal, and an output terminal outputting a second output signal, wherein the second multiplexer selects the second input signal to be output as the second output signal in the initial state;
    a third multiplexer having a first input terminal receiving a DC signal DC-converted from the first output signal, a second input terminal receiving the second output signal, and an output terminal outputting a third output signal, wherein the third multiplexer selects the second output signal to be output as the third output signal in the initial state; and
    a control circuit having a first input terminal and a second input terminal respectively receiving the first output signal and the third output signal, wherein the control circuit is configured to mutually subtract the first output signal and the third output signal to generate a first difference signal and a second difference signal, respectively count numbers of signal edges of the first difference signal and the second difference signal within a first preset time, and determine whether the signal input mode is a differential signal according to the numbers of the signal edges counted within the first preset time, wherein in response to the signal input mode being determined not to be the differential signal, the control circuit outputs a mode selecting signal with a first logic level to control the third multiplexer to select the DC signal to be output as the third output signal, and wherein in response to the signal input mode being determined as the differential signal, the control circuit outputs the mode selecting signal with a second logic level to control the third multiplexer to keep selecting the second output signal to be output as the third output signal.

2. The signal receiving device according to claim 1, wherein the control circuit includes:
    a signal detection circuit coupled to the first input terminal and the second input terminal of the control circuit, and configured to detect whether a signal level of the first output signal and/or a signal level of the third output signal exceed(s) a first threshold voltage, wherein in response to the signal level of the first output signal and/or the signal level of the third output signal being determined to exceed the first threshold voltage, the signal detection circuit outputs an enabling signal; and a signal processing circuit coupled to the first input terminal and the second input terminal of the control circuit, wherein in response to receiving the enabling signal output by the signal detection circuit, the signal processing circuit is configured to perform a mutual subtraction on the first output signal and the third output signal, a result of the mutual subtraction is then compared with a second threshold voltage to eliminate noises with a signal level less than the second threshold voltage to generate the first difference signal and the second difference signal, respectively count the numbers of the signal edges of the first difference signal and the second difference signal within the first preset time, and determine whether the signal input mode is the differential signal according to the numbers of the signal edges counted within the first preset time.

3. The signal receiving device according to claim 2, wherein the signal detection circuit includes:

a first comparator having a non-inverting input terminal and an inverting input terminal respectively receiving the first output signal and the first threshold voltage, wherein in response to the signal level of the first output signal exceeding the first threshold voltage, an output terminal of the first comparator outputs a first comparison signal with a high logic level, and in response to the signal level of the first output signal not exceeding the first threshold voltage, the output terminal of the first comparator outputs the first comparison signal with a low logic level;

a first flip-flop having a clock input terminal coupled to the output terminal of the first comparator, wherein in response to the first comparator output terminal outputting the first comparison signal with the high logic level, the output terminal of the first flip-flop continuously outputs a first latch signal with the high logic level;

a second comparator having a non-inverting input terminal and an inverting input terminal respectively receiving the third output signal and the first threshold voltage, wherein in response to the signal level of the third output signal exceeding the first threshold voltage, the output terminal of the second comparator outputs a second comparison signal with the high logic level, and in response to the signal level of the third output signal not exceeding the first threshold voltage, the output terminal of the second comparator output the second comparison signal with the low logic level;

a second flip-flop having a clock input terminal coupled to the output terminal of the second comparator, wherein in response to the second comparator outputting the second comparison signal with the high logic level, the output terminal of the second flip-flop keeps outputting a second latch signal with the high logic level; and an OR gate having a first input terminal and a second input terminal respectively receiving the first latch signal and the second latch signal, and an output end for outputting an operation result generated after an OR logic is applied to the first latch signal and the second latch signal as the enabling signal.

4. The signal receiving device according to claim 3, wherein the signal processing circuit includes:

a third comparator having a first non-inverting input terminal and a first inverting input terminal respectively receiving the first output signal and the third output signal, wherein the third comparator is configured to generate the second threshold voltage between a second non-inverting input terminal and a second inverting input terminal of the third comparator, such that the third comparator compares a result of subtracting the third output signal from the first output signal with the second threshold voltage to generate the first difference signal to be output from an output terminal of the third comparator;

a fourth comparator having a first non-inverting input terminal and a first inverting input terminal respectively receiving the third output signal and the first output signal, wherein the fourth comparator is configured to generate the second threshold voltage between a second non-inverting input terminal and a second inverting input terminal of the fourth comparator, such that the fourth comparator compares a result of subtracting the first output signal from the third output signal with the second threshold voltage to generate the second difference signal to be output from an output terminal of the fourth comparator; and a counting circuit coupled to the third comparator and the fourth comparator, configured to receive the first difference signal and the second difference signal, respectively count the numbers of the signal edges of the first difference signal and the second difference signal within the first preset time, and determine, according to the number of signal edges counted in the first preset time, whether the signal input mode is the differential signal, thereby outputting the mode selection signal with the first logic level or the second logic level.

5. The signal receiving device according to claim 2, wherein the control circuit further includes:

a feature comparison circuit coupled to the signal processing circuit, configured to perform a signal feature comparison on the first difference signal and/or the second difference signal to determine whether the first difference signal and/or the second difference signal have the expected at least one signal feature, wherein in response to determining that the first difference signal and/or the second difference signal have the expected at least one signal feature, the feature comparison circuit outputs at least one input source selection signal to control the first multiplexer and the second multiplexer to continuously and respectively select the first input signal and the second input signal to be output as the first output signal and the second output signal, or only control the first multiplexer to continuously select the first input signal to be output as the first output signal, and wherein in response to determining that the first difference signal and/or the second difference signal do not have the expected at least one signal feature, the feature comparison circuit outputs the at least one input source selection signal to control the first multiplexer and the second multiplexer to respectively change and select the second input signal and the first input signal to be output as the first output signal and the second output signal, or only control the first multiplexer to change and select the second input signal to be output as the first output signal.

6. The signal receiving device according to claim 5, wherein the step of determining whether the signal input mode is the differential signal according to the numbers of the signal edges counted within the first preset time includes:

determining whether the numbers of the signal edges counted within the first preset time conform to a first expected value;

in response to determining that the numbers of the signal edges counted within the first preset time conforms to the first expected value, determining the signal input mode as the differential signal; and in response to determining that the numbers of the signal edges counted within the first preset time do not conform to the first expected value, determining the signal input mode as not being the differential signal.

7. The signal receiving device according to claim 6, wherein in response to determining that the signal input mode is not the differential signal and outputting the mode selection signal with the first logic level to control the third multiplexer to select the DC signal to be output as the third output signal, the signal processing circuit is further configured to reset an operation of the signal detection circuit, such that the signal detection circuit re-detects whether the signal levels of the first output signal and/or the third output signal exceed the first threshold voltage, the signal processing circuit also resets an operation of the signal processing circuit, such that when the signal processing circuit receives the enabling signal output by the signal detection circuit again, the signal processing circuit is again configured to perform the mutual subtraction on the first output signal and the third output signal, and then compare the result of the mutual subtraction with the second threshold voltage to eliminate noises with the signal level less than the second threshold voltage to generate the first difference signal and the second difference signal, and respectively count the numbers of the signal edges of the first difference signal and the second difference signal within the second preset time, to determine whether the input signal mode is a single ended signal according to the numbers of the signal edges counted within the second preset time.

8. The signal receiving device according to claim 7, wherein the step of determining whether the signal input mode is the single ended signal according to the numbers of the signal edges counted within the second preset time includes:

determining whether the numbers of the signal edges counted within the second preset time conforms to a second expected value;

in response to determining that the numbers of the signal edges counted within the second preset time conforms to the second expected value, determining the signal input mode as the signal ended signal; and in response to determining that the numbers of the signal edges counted within the second preset time do not conform to the second expected value, determining the signal input mode as not being the signal ended signal.

9. The signal receiving device according to claim 8, wherein after the signal input mode is determined to be the differential signal, in response to determining that the first difference signal and/or the second difference signal have the expected at least one signal feature, the control circuit outputs the at least one input source selection signal to control the first multiplexer and the second multiplexer to continuously and respectively select the first input signal and the second input signal to be output as the first output signal and the second output signal, and wherein in response to determining that the first difference signal and/or the second difference signal do not have the expected at least one signal feature, the control circuit outputs the at least one input source selection signal to control the first multiplexer and the second multiplexer to respectively change and select the second input signal and the first input signal to be output as the first output signal and the second output signal.

10. The signal receiving device according to claim 9, wherein after the signal input mode is determined not to be the differential signal, in response to determining that the first difference signal and/or the second difference signal have the expected at least one signal feature, the control circuit outputs the at least one input source selection signal to only control the first multiplexer to continuously select the first input signal to be output as the first output signal, and wherein in response to determining that the first difference signal and/or the second difference signal do not have the expected at least one signal feature, the control circuit outputs the at least one input source selection signal to only control the first multiplexer to change and select the second input signal to be output as the first output signal.

11. A signal processing method executed in a signal receiving device including a first multiplexer, a second multiplexer, a third multiplexer, and a control circuit, the signal processing method comprising:

controlling the first multiplexer to select a first input signal to be output as a first output signal, controlling the second multiplexer to select a second input signal to be output as the second output signal, and controlling the third multiplexer to select the second output signal to be output as a third output signal;

detecting whether signal levels of the first output signal and/or the third output signal exceed a first threshold voltage;

in response to the signal levels of the first output signal and/or the third output signal exceeding the first threshold voltage, mutually subtracting the first output signal and the third output signal to generate a first difference signal and a second difference signal, and respectively counting numbers of signal edges of the first difference signal and the second difference signal within the first preset time;

determining whether the numbers of the signal edges counted within the first preset time conform to a first expected value;

in response to determining the numbers of the signal edges counted within the first preset time does not conform to the first expected value, outputting a mode selection signal with a first logic level to control the third multiplexer to change and select a DC signal DC-converted from the first output signal to be output as the third output signal; and in response to determining the numbers of the signal edges counted within the first preset time conform to the first expected value, outputting the mode selection signal with a second logic level to control the third multiplexer to keep selecting the second output signal to be output as the third output signal.

12. The signal processing method according to claim 11, wherein after outputting the mode selection signal with the second logic level to control the third multiplexer to keep selecting the second output signal to be output as the third output signal, the signal processing method further comprising:

performing a signal feature comparison on the first difference signal and/or the second difference signal to determine whether the first difference signal and/or the second difference signal have an expected at least one first signal feature;

in response to determining that the first difference signal and/or the second difference signal have the expected at least one first signal feature, outputting at least one input source selection signal to control the first multiplexer and the second multiplexer to keep respectively selecting the first input signal and the second input signal to be output as the first output signal and the second output signal; and in response to determining that the first difference signal and/or the second difference signal do not have the expected at least one first signal feature, outputting the at least one input source selection signal to control the first multiplexer and the second multiplexer to respectively change and select the second input signal and the first input signal to be output as the first output signal and the second output signal.

13. The signal processing method according to claim 12, wherein after outputting the mode selection signal with the first logic level to control the third multiplexer to select the DC signal to be output as the third output signal, the signal processing method further comprises:

re-detecting whether the signal levels of the first output signal and/or the third output signal exceed the first threshold voltage;

in response to the signal levels of the first output signal and/or the third output signal exceeding the first threshold voltage, mutually subtracting the first output signal and the third output signal to generate the first difference signal and the second difference signal, and respectively counting the numbers of the signal edges of the first difference signal and the second difference signal within a second preset time;

determining whether the numbers of the signal edges counted within the second preset time conform to a second expected value; and in response to determining the numbers of the signal edges counted within the second preset time conform to the second expected value, outputting the mode selection signal with the first logic level to control the third multiplexer to keep selecting the DC signal to be output as the third output signal.

14. The signal processing method according to claim 13, wherein after outputting the mode selection signal with the first logic level to control the third multiplexer to keep selecting the DC signal to be output as the third output signal, the signal processing method further comprising:

performing the signal feature comparison on the first difference signal and/or the second difference signal to determine whether the first difference signal and/or the second difference signal have an expected at least one second signal feature;

in response to determining the first difference signal and/or the second difference signal have the expected at least one second signal feature, outputting the at least one input source selection signal to control the first multiplexer to keep selecting the first input signal to be output as the first output signal; and in response to determining the first difference signal and/or the second difference signal do not have the expected at least one second signal feature, outputting the at least one input source selection signal to control the first multiplexer to change and select the second input signal to be output as the first output signal.

15. The signal processing method according to claim 11, wherein the step of mutually subtracting the first output signal and the third output signal to generate the first difference signal and the second difference signal includes:

performing a mutual subtraction on the first output signal and the third output signal, and then comparing the mutual subtraction result with a second threshold voltage to eliminate noise with a signal level less than the second threshold voltage to generate the first difference signal and the second difference signal.

\* \* \* \* \*